(12) United States Patent
Lange et al.

(10) Patent No.: US 12,086,710 B2
(45) Date of Patent: Sep. 10, 2024

(54) PREDICTIVE DATA CAPACITY PLANNING

(71) Applicant: Hewlett Packard Enterprise Development LP, Houston, TX (US)

(72) Inventors: Klaus-Dieter Lange, Houston, TX (US); Mukund Kumar, Bangalore (IN); Shreeharsha Gudal Neelakantachar, Bangalore (IN); Hung D Cao, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 863 days.

(21) Appl. No.: 17/171,282

(22) Filed: Feb. 9, 2021

(65) Prior Publication Data

US 2022/0253689 A1    Aug. 11, 2022

(51) Int. Cl.
| | |
|---|---|
| *G06N 3/08* | (2023.01) |
| *G06F 17/18* | (2006.01) |
| *G06F 18/214* | (2023.01) |
| *G06F 18/23* | (2023.01) |
| *G06N 20/10* | (2019.01) |

(52) U.S. Cl.
CPC .............. *G06N 3/08* (2013.01); *G06F 17/18* (2013.01); *G06F 18/2155* (2023.01); *G06F 18/23* (2023.01); *G06N 20/10* (2019.01)

(58) Field of Classification Search
CPC ....................................................... G06N 3/08
See application file for complete search history.

(56) References Cited

U.S. PATENT DOCUMENTS

| | | |
|---|---|---|
| 8,443,153 B1 | 5/2013 | Edwards et al. |
| 8,812,456 B2 | 8/2014 | Daga et al. |
| 8,825,752 B1 | 9/2014 | Madhavan |
| 8,874,848 B2 | 10/2014 | Soundararajan et al. |
| 8,903,995 B1 | 12/2014 | Basak et al. |
| 9,122,739 B1 | 9/2015 | Yadwadkar et al. |

(Continued)

OTHER PUBLICATIONS

Chen et al., "Optimizing Performance of Hadoop with Parameter Tuning", ITM Web of Conferences 12, 2017, 4 pages.

(Continued)

*Primary Examiner* — Hal Schnee
(74) *Attorney, Agent, or Firm* — Sheppard Mullin Richter Hampton LLP (57) ABSTRACT

Predictive big data capacity planning is described. An example includes instructions for receiving workload data and computing operation data related to workload processing for a customer in a computing infrastructure, the computing infrastructure including one or more clusters, the one or more clusters including one or more data nodes; analyzing the received data to identify relationship information between the workload data and the computing operation data; performing predictive analytics to identify a significant value that relates to performance variations in workload performance or usage pattern characteristics for data growth scale factors in the computing infrastructure; generating a knowledge base based at least in part on the predictive analytics; training a machine learning model based at least in part on the knowledge base; and utilizing the trained machine learning model to generate a computing infrastructure configuration recommendation for the customer.

20 Claims, 8 Drawing Sheets

(56) References Cited

U.S. PATENT DOCUMENTS

| | | | |
|---|---|---|---|
| 9,354,989 | B1 | 5/2016 | Sehgal et al. |
| 9,406,029 | B2 | 8/2016 | Susarla et al. |
| 9,514,022 | B1 | 12/2016 | Basak et al. |
| 9,635,101 | B2 | 4/2017 | Mathur et al. |
| 9,858,106 | B2 | 1/2018 | Kondaveeti et al. |
| 10,355,946 | B1 | 7/2019 | Dolas et al. |
| 10,521,326 | B2 | 12/2019 | Babu et al. |
| 10,884,636 | B1* | 1/2021 | Abrol .................... G06F 3/0631 |
| 2011/0078291 | A1* | 3/2011 | Bickson .............. G06F 11/3409 709/224 |
| 2017/0230267 | A1* | 8/2017 | Armolavicius ....... H04L 43/062 |
| 2018/0063250 | A1* | 3/2018 | Justin ................... H04L 67/125 |
| 2018/0137412 | A1* | 5/2018 | Nikkhah ................ G06N 3/044 |
| 2019/0036789 | A1* | 1/2019 | Kaplunov ........ G06Q 10/06393 |
| 2019/0386889 | A1* | 12/2019 | Noorshams ............. H04L 67/10 |
| 2023/0100227 | A1* | 3/2023 | Siracusano ............ H04L 47/24 709/224 |

OTHER PUBLICATIONS

Cloudera, "Cloudera pricing", available online at <https://www.cloudera.com/products/pricing.html>, 2021, 10 pages.

Wikipedia, "Data binning", available online at <https://en.wikipedia.org/w/index.php?title=Data_binning&oldid=937192192>, Jan. 23, 2020, 2 pages.

Deepak Mane, "How to Plan Capacity for Hadoop Cluster," Apr. 29, 2014, pp. 1-15, Retrieved from the Internet on Oct. 23, 2020 at URL: <hadoopmag.com/how-to-plan-capacity-for-hadoop-cluster/>.

Nitin Jain, "Big Data Capacity Planning: Achieving the Right Size of the Hadoop Cluster," Feb. 1, 2019, pp. 1-6, Guavus, Inc., Retrieved from the Internet on Oct. 23, 2020 at URL: <www.guavus.com/technical-blog/big-data-capacity-planning-achieving-the-right-size-of-the-hadoop-cluster/>.

R.R. Pentareddy, "Big Data Capacity Planning: Achieving Right Sized Hadoop Clusters and Optimized Operations," White Paper, 2016, pp. 1-7.

Datadog, "Machine Learning", available online at <https://web.archive.org/web/20210119115450/https://www.datadoghq.com/solutions/machine-learning/>, Jan. 19, 2021, 5 pages.

Dhandre, Pravin "Selecting Statistical-Based Features in Machine Learning Application", Packt Hub, available online at https://hub.packtpub.com/selecting-statistical-based-features-in-machine-learning-application/.

Gonzalo Ferreiro Volpi, "Hypothesis Testing in Machine Learning: What for and Why", Data Series, available online at <https://medium.com/dataseries/hypothesis-testing-in-machine-learning-what-for-and-why-ad6ddf3d7af2>, Oct. 23, 2019, 20 pages.

HPE, "HPE Sizing Tool for Elastic Platform for Big Data Analytics (EPA)", User Guide, Version 2.0, Aug. 2020, 36 Pages.

Maklin, Cory, "Gradient Boosting Decision Tree Algorithm Explained", available online at <https://towardsdatascience.com/machine-learning-part-18-boosting-algorithms-gradient-boosting-in-python-ef5ae6965be4>, May 18, 2019, 19 pages.

Rajwanshi, Karan, "Feature Engineering: The key to predictive modeling", available online at <https://medium.com/@karanrajwanshi/feature-engineering-the-key-to-predictive-modeling-8f1935b3db4f>, May 9, 2018, 13 pages.

Rising Odequa, "Exploratory Data Analysis, Feature Engineering, and Modelling using Supermarket Sales Data. Part 1", available online at <https://towardsdatascience.com/exploratory-data-analysis-feature-engineering-and-modelling-using-supermarket-sales-data-part-1-228140f89298>, Dec. 14, 2018, 23 pages.

Seagate, "DataAge 2025—The Digitization of the World", available online at <https://www.seagate.com/in/en/our-story/data-age-2025/>, 2021, 3 pages.

Textbook, "Principles and Techniques of Data Science", available online at <https://web.archive.org/web/20190428150318if_/https://www.textbook.ds100.org/ch/18/hyp_introduction.html>, Apr. 28, 2019, 1 page.

TPC, "TPCx-BB", available online at <http://www.tpc.org/tpcx-bb/default5.asp>, 2021, 1 page.

Turi, "Feature Binning | Turi Machine Learning Platform User Guide", available online at <https://web.archive.org/web/20170711010630/https://turi.com/learn/userguide/feature-engineering/feature_binner.html>, Jul. 11, 2017, 3 pages.

* cited by examiner

PREDICTIVE DATA CAPACITY PLANNING

BACKGROUND

Enterprise clients of computing infrastructure services are increasingly motivated to improve cost of operations in large scale data-intensive computing. The large scale operations may include Big Data technology, which generally refers to operations with data sets that are too large or complex to be addressed by traditional data-processing application software.

Analyzing a large and growing amount of unstructured, semi-structured, or structured data is a high priority task for many clients, and clients utilizing computing infrastructure services to provide such analysis may need to meet tight SLAs (Service Level Agreements), high performance, and uncompromised uptime in Big Data processing.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to predictive data capacity planning.

As the world's population moves towards greater and greater connection, it is expected that the global datasphere will grow to many zettabytes, with a large percentage of this data requiring real-time processing. Given the pace of digitization in enterprises, much of this data will reside in enterprise data repositories or data lakes. Companies now deploy large clusters of Big Data solution stacks to handle such data.

As a result, there is an ever growing demand for Big Data solutions, driving a demand for sufficient computing infrastructure to host these solutions. Modern enterprises demand that this data be hosted and retrieved securely and on-demand, and that they be processed in near-real-time to deliver business value. This places a huge demand on the underlying computing infrastructure spanning compute, storage, networking, memory, and acceleration hardware.

The ever-increasing data growth, together with the demand for real-time business insights from that data, requires enterprise grade infrastructure that can guarantee the required performance and data security. The rapid data growth and tight Service Level Agreement (SLA) demands have led to an increased IT sprawl utilizing premium hardware and software. In response, a well-tuned Big Data stack can help check this data and infrastructure sprawl, ensuring better Return on Investment (ROI) and reduced Total Cost of Ownership (TCO) for the infrastructure investment.

However, as the data needs of Big Data customers are increasing quickly, simply intending to purchase sufficient hardware capacity in a computing infrastructure to ensure sufficient performance can result in either under-capacity and reduced performance, or over-capacity and unnecessary cost. As used herein, hardware capacity refers to hardware elements that are available for computing support, which may include, for example, a number of processing nodes, an amount of storage, a number of processors, a number of licenses related to data operations, or other measures of computing capacity. To properly balance cost and performance, a customer needs accurate forecasting of data capacity needs as the customer's operations scale up over time, which is very difficult to provide in a large and rapidly changing environment. A customer may refer to an organization or entity that consumes hardware and/or software computing infrastructure to carry out Big Data analysis.

In some embodiments, an apparatus, system, or process is provided to apply predictive analytics that can predict cost-optimal computing infrastructure configurations and environments for customers, such as Big Data customers on complex deployments, ensuring compliance with the customers business SLAs while also avoiding costly overcapacity. In some embodiments, the apparatus, system, or process may further take into account potential Big Data growth year over year, which may be applied to enable a Big Data provider to maximize its ROI (Return on Investment) via a cost-optimized sizing method.

As used herein, Big Data refers in general to large datasets, such as datasets whose size is beyond the ability of typical database software tools to capture, store, manage, and analyze.

Figure 1:
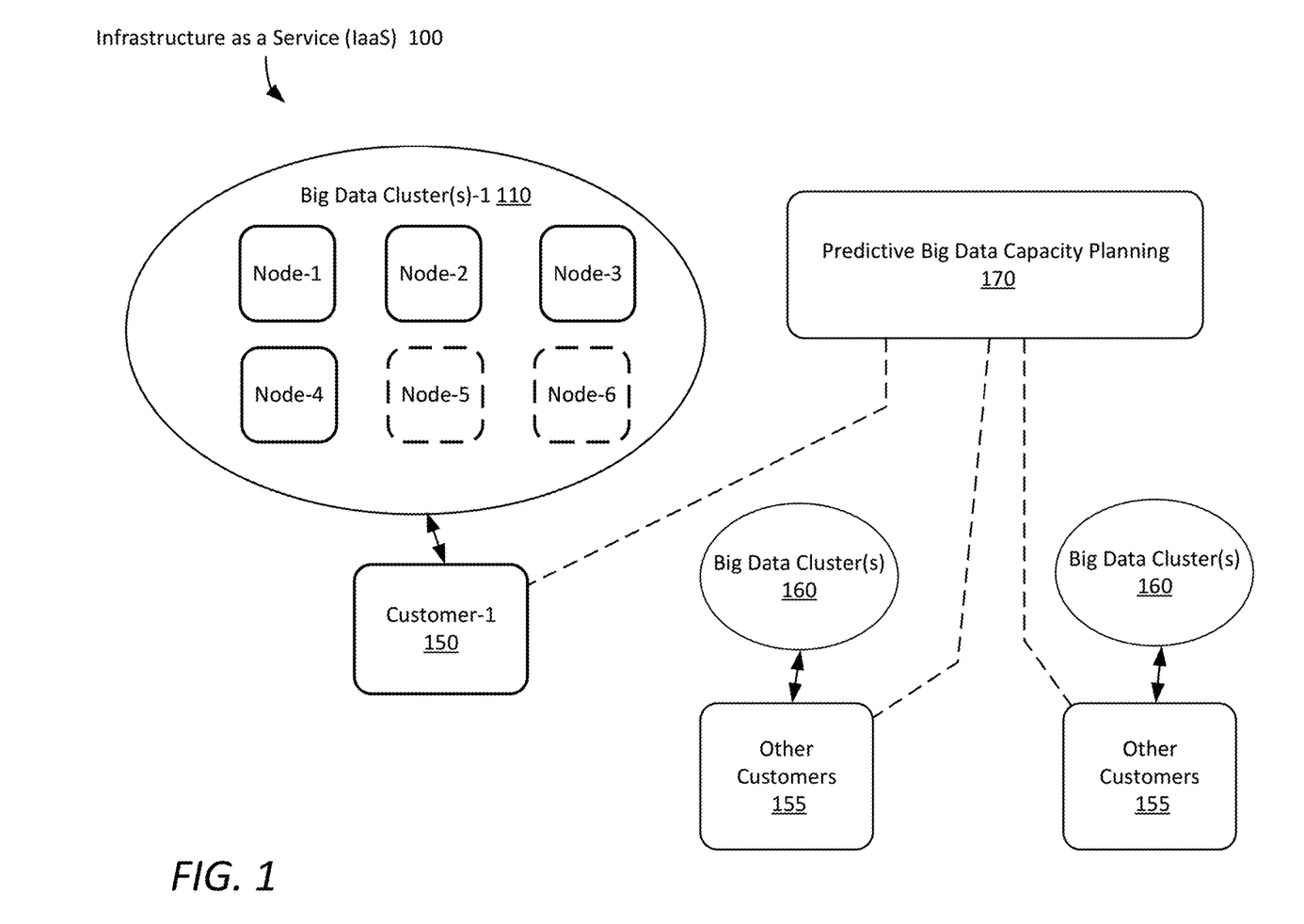
FIG. 1 is an illustration of a computing infrastructure to provide optimized capacity planning.

FIG. 1 is an illustration of a computing infrastructure to provide optimized capacity planning, according to some embodiments. As illustrated, in a particular computing infrastructure, such as in the illustrated Infrastructure as a Service (IaaS) 100, customers, such as Customer-1 150 and other customers 155, may purchase computing infrastructure services to support the data needs of such customers. For illustration, Customer-1 150 may utilize a particular data capacity represented in FIG. 1 by Big Data Clusters-1 110, currently including a set of data nodes shown as Node-1, Node-2, Node-3, and Node-4. Also illustrated are additional Big Data clusters 160 that may be utilized for the data infrastructure needs of the other customers 155. Those deployments in a computing infrastructure may be performed in private, on-premise operation or in a co-location infrastructure, such a multi-tenancy environment where many tenants and users access the same resources. In one example, a data node may include 16 processor cores, 128 GB memory, and 48 TB of storage, in a Cloudera Data Platform (also referred to herein as CDP, which is produced by Cloudera, Inc.) private cloud, each data node requiring a significant hardware and software investment. However, the hardware utilized to support data operations is not limited to any particular implementation. Meeting such SLAs can quickly become difficult or impossible if sufficient data infrastructure capacity is not maintained.

As data requirements continue to grow exponentially, enterprises traditionally add hardware into their Big Data clusters to continuously deliver insights at required levels of business SLAs (Service Level Agreements). For example, an SLA may require processing 10 TB (terabytes) worth of unstructured data into actionable business insights within 20 minutes of the dataset availability). As shown in FIG. 1, this may result in Customer-1 considering, for example, the addition of Node-5 and Node-6 to ensure that future demand is met.

However, every additional data node added to a Big Data cluster incurs opex (operational expenditure) and capex (capital expenditure) costs, coming from the cost of infrastructure and software, with the software in particular contributing significantly to opex. As a result, the customers 150-155, as well as the IaaS 100 itself, may greatly benefit from a solution that is capable of understanding customers' workload characteristics and assisting in properly planning the cluster capacity in order to size the on-premise or co-location infrastructure as needed.

In some embodiments, predictive data capacity planning, such as the Predictive Big Data Capacity Planning apparatus, system, or process 170 illustrated in FIG. 1, is to cost-optimize the sizes of computing infrastructures of customers to meet future data growth, while at the same time meeting the customers' specific requirements. In some embodiments, a predictive data capacity planning system is to apply predictive analytics and machine learning to generate an optimized solution for capacity for each individual customer.

Figure 2:
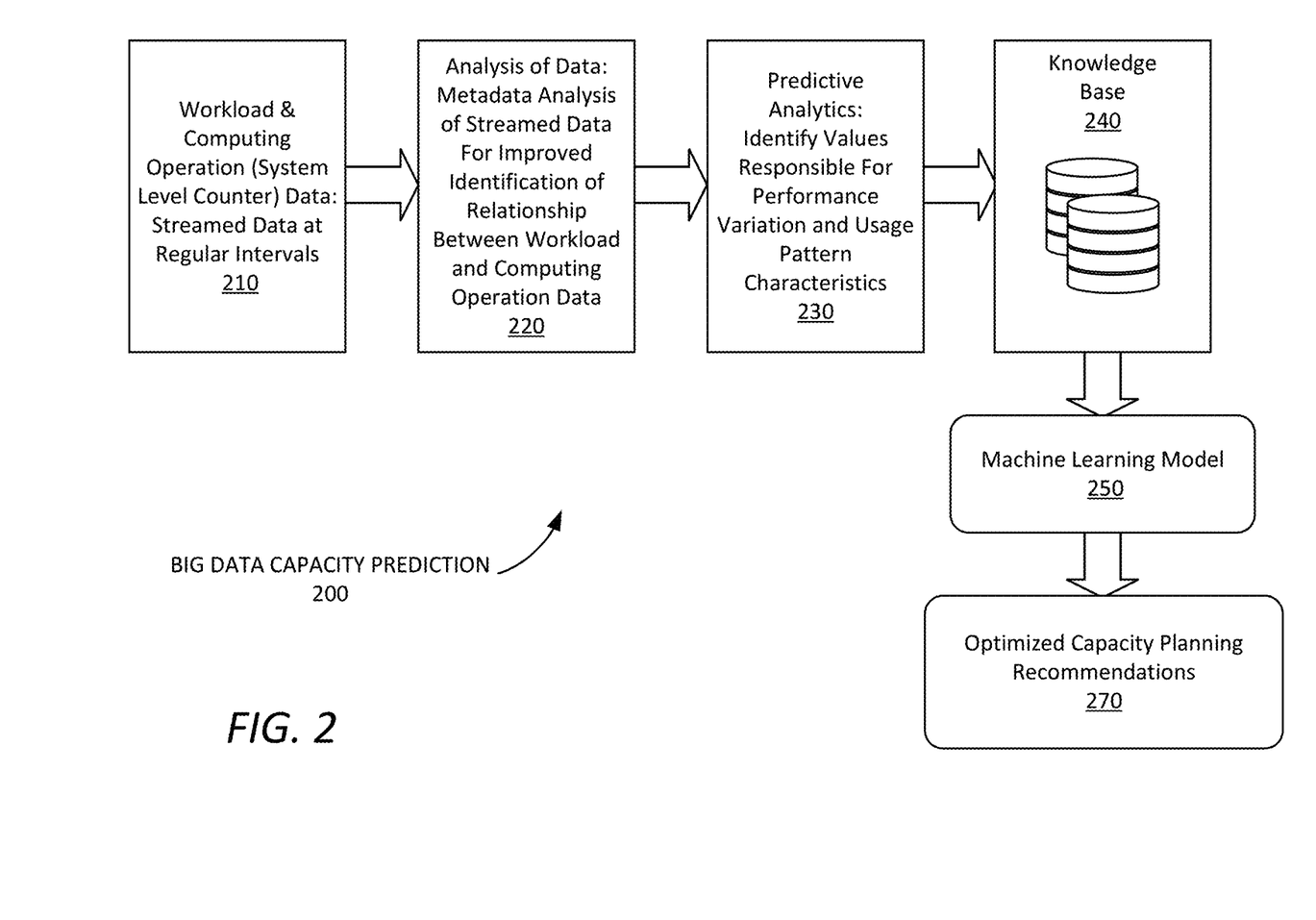
FIG. 2 is an illustration of predictive computing infrastructure capacity planning, according to some embodiments.

FIG. 2 is an illustration of predictive computing infrastructure capacity planning, according to some embodiments. In some embodiments, a Big Data capacity prediction operation 200 is to gather customer-specific data growth requirements and utilize such information in predicting customer resource demands to meet future data growth. The operation may proceed according to customer requirements in a computing infrastructure (such as further illustrated in FIG. 3), including requirements for Big Data storage components, current data growth, deployment details, resource characteristics, and SLAs.

In some embodiments, the Big Data capacity prediction operation 200 includes receipt of streamed workload data and computing operation data (such as system level counter data) at phase 210, wherein the data may, for example, be received at certain minimal regular intervals. The system level counter data relates to usage patterns (usage patterns referring to patterns in the usage of a computing system) and application level performance metrics (referring to any measures for tracking the performance of an application, such as data throughput, response time, and others), as further illustrated in FIG. 4.

In some embodiments, the operation 200 further includes analysis of the received data at phase 220 to identify data relationships. For example, the analysis may include analysis of metadata related to the streamed workload data and computing operation data to provide improved identification of the relationships between the data elements. The analysis may more specifically include, for example, measurement of the performance of certain identified system counters at different workload levels.

The resulting relationship data is then utilized in a predictive analytics phase 230 to identify significant values (such as significant system level counters) that are responsible for (or are correlated with) variations in workload performance in the computing infrastructure, and identify corresponding usage patterns characteristics for different data growth scale factors (the scale factor referring to the rate at which the data growth is occurring). The predictive analysis analytics is to generate a knowledge base (KB) 240, which may include, for example, performance delta key value mappings (referring to mappings of changes in system values, such as system level counters, to changes in system performance) for classified Big Data components and cluster configuration parameters (referring to the parameters that govern the operation of a data cluster in a computing infrastructure), as further illustrated in FIG. 5.

Figure 6:
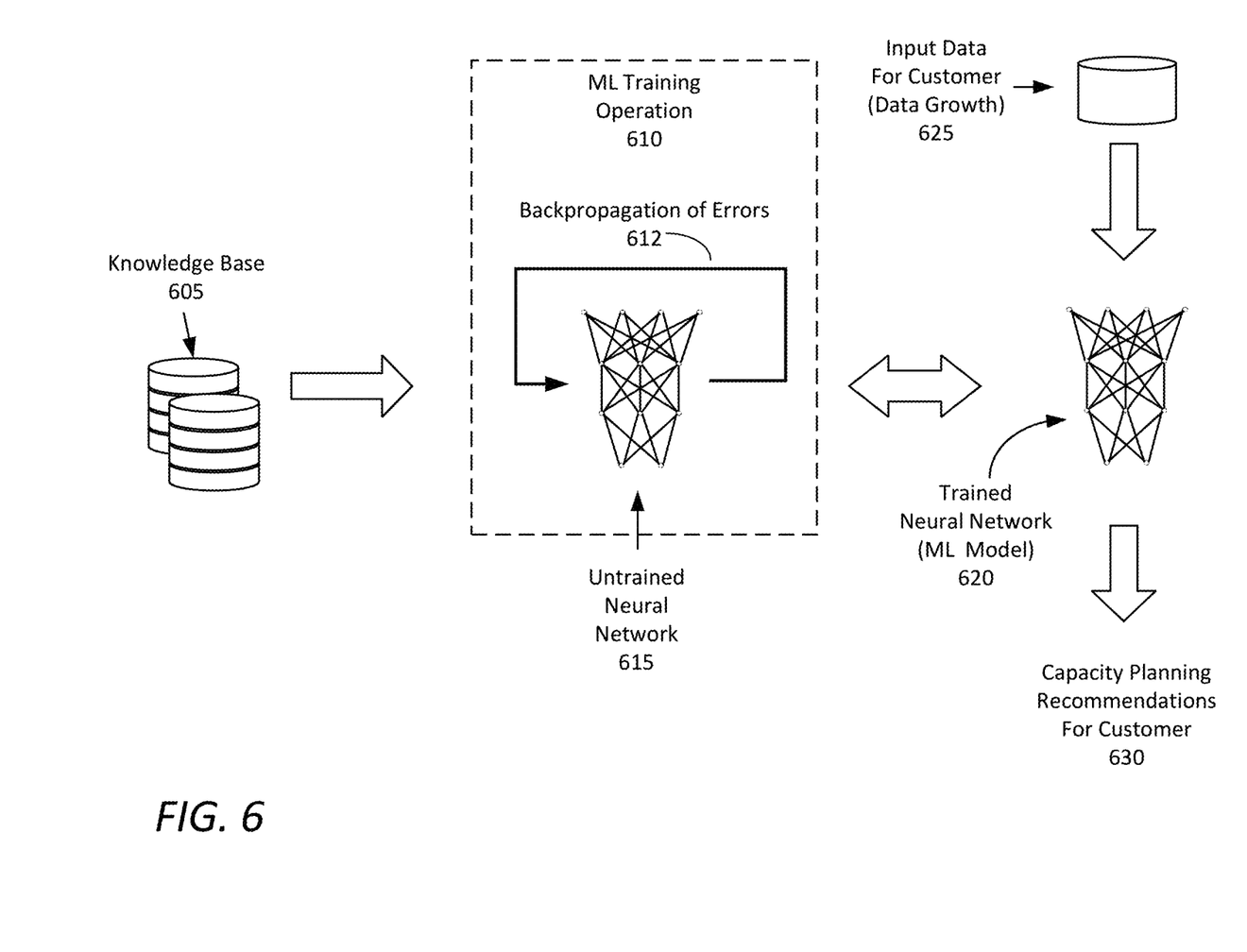
FIG. 6 is an illustration of the building and application of a trained machine learning model for predictive computing infrastructure capacity planning.

In some embodiments, the knowledge base is used for building a machine learning model 250 that learns adaptively as different Big Data components and use cases are provided in training of the model, as further illustrated in FIG. 6. The machine learning model 250 is then utilized to generate optimized capacity planning recommendations 270. In some embodiments, capacity planning results may be provided to customers to enable such customers to make hardware planning choices in a computing infrastructure that meet future data growth requirements in a cost effective manner.

Further details regarding the operations of the Big Data capacity prediction operation 200 may be as provided in FIGS. 3-6.

Figure 3:
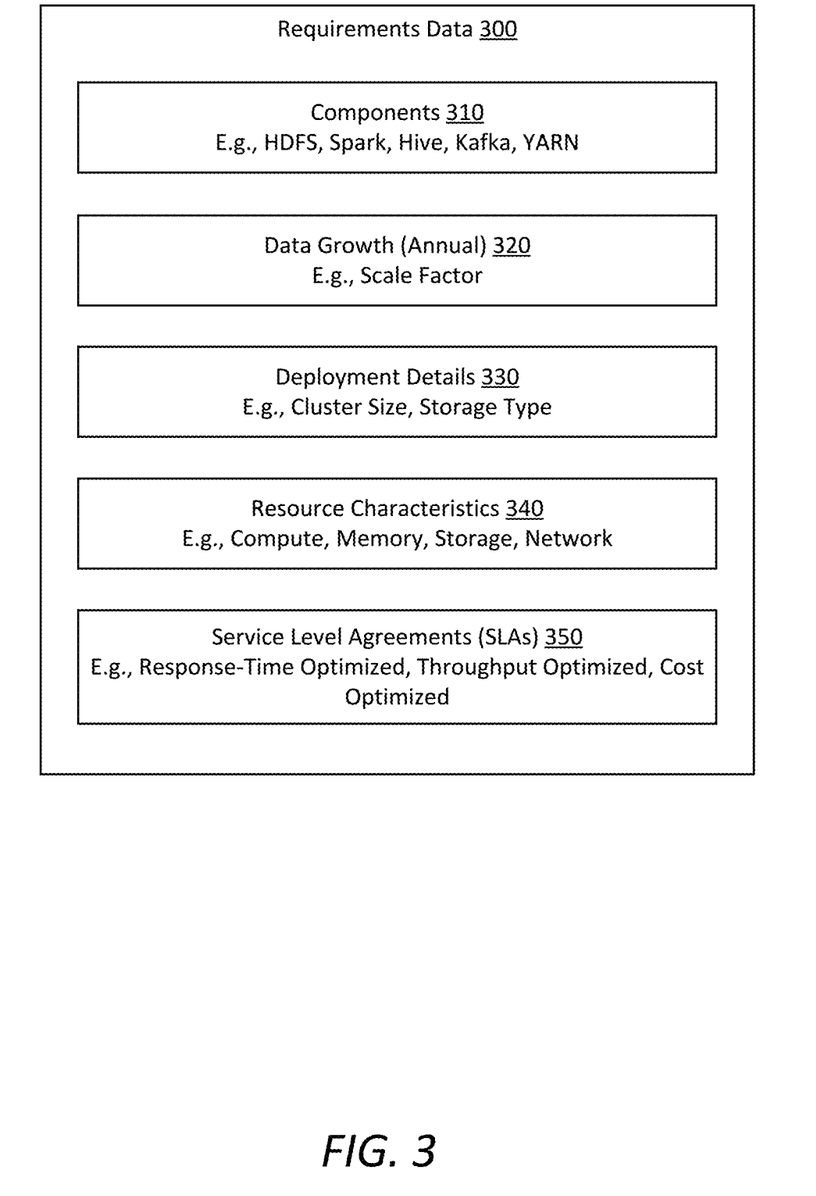
FIG. 3 is an illustration of example requirements data for predictive computing infrastructure capacity planning, according to some embodiments.

FIG. 3 is an illustration of example requirements data for predictive computing infrastructure capacity planning, according to some embodiments. In some embodiments, requirements data 300 includes data relevant to a consumer's needs and operations in a computing infrastructure. The requirements data 300 may be received from a customer or other party, and may, for example, include customer inputs in JSON (JavaScript Object Notation) format as key value pairs with respect to the following for the customer:

Applicable batch and stream-based Big Data components 310, wherein the components may include, for example, HDFS (Hadoop Distributed File System), Spark, Hive, Kafka, and Hadoop YARN.

Current data growth size and scale factor 320 (i.e., the data growth in terms of the amount of growth and the rate at which the data is increasing), which may be expressed in, for example, an annual growth factor for the customer in the computing infrastructure.

Deployment details 330, such as cluster size and storage type for the data of the customer in the computing infrastructure.

Workload resource characteristics 340 for support of the customer, which may include compute (CPU or other processing elements), memory, storage, and network characteristics.

Performance SLAs 350 (Service Level Agreements), which may include response-time optimized, throughput optimized, or cost optimized requirements for the customer.

In some embodiments, applicable requirements may include other types of values that relate to the customer data operations. The requirements data then may be utilized in Big Data capacity prediction operations. For example, predictive capacity planning results, such as the optimized capacity planning recommendations 270 illustrated in FIG. 2, for a particular customer may be generated according to the Big Data components 310 that have been implemented for the customer; may reflect a current data growth factor 320 that exists for the customer; may reflect the particular computing infrastructure deployment details 330 utilized for the customer; may reflect the workload resource characteristics 340 that are provided for the customer; and/or may be required to meet the relevant performance SLAs 350 that exist for the customer.

Figure 4:
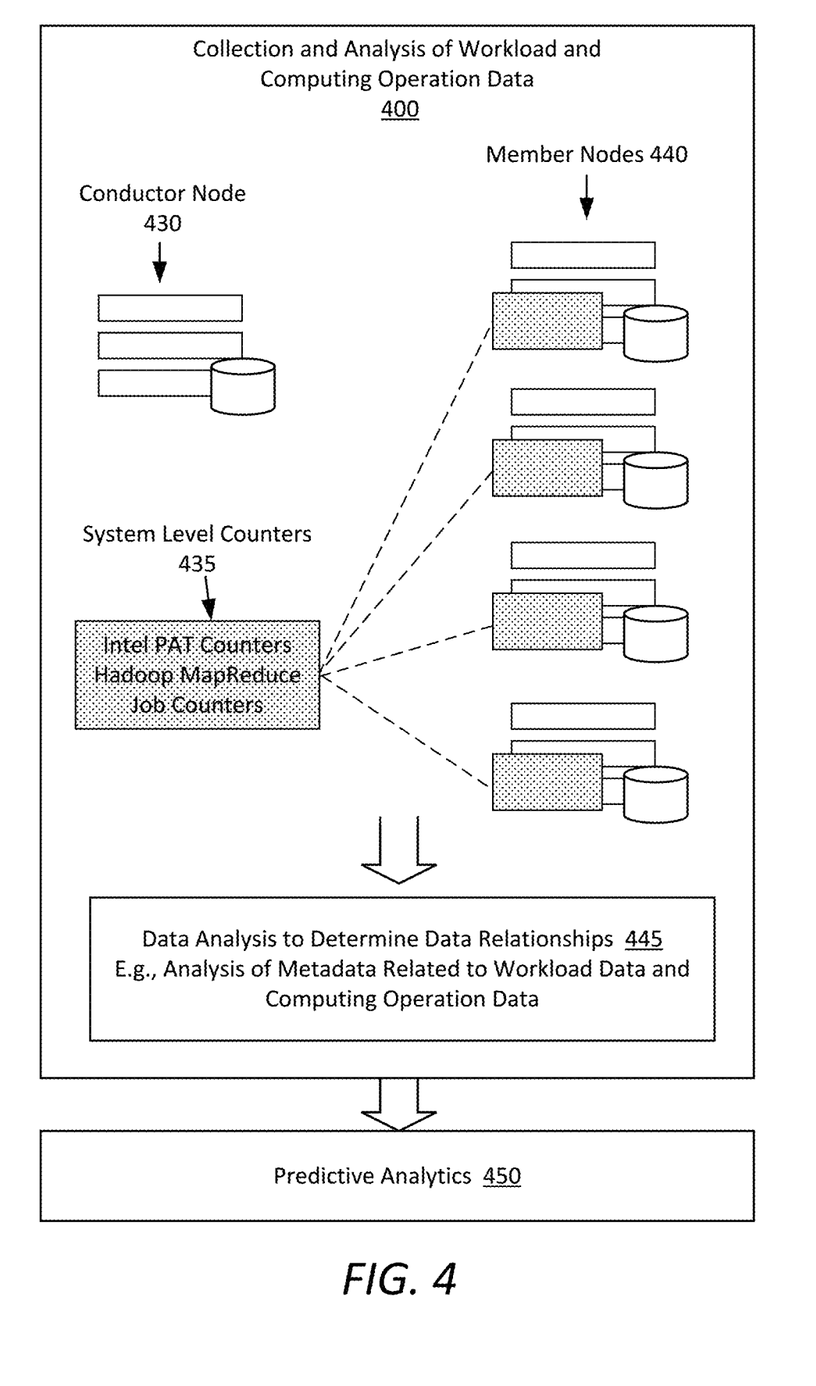
FIG. 4 is an illustration of collection and analysis of streamed workload data and system level counter data for predictive computing infrastructure capacity planning, according to some embodiments.

FIG. 4 is an illustration of collection and analysis of streamed workload data and computing operation data for predictive computing infrastructure capacity planning, according to some embodiments. In some embodiments, a collection and analysis component or apparatus 400 is to receive streamed workload data and computing operation data (such as system level counter) data in processing operation of workloads in a computing infrastructure for a customer. In some embodiments, the analysis component or apparatus 400 is to perform data analysis 445 to determine relationships between the workload data and the computing operation data. The data analysis 445 may include, for example, analysis of metadata related to the workload data and system level counter data to assist in determining what relationships exist between the received workload data and computing operation data.

In some embodiments, the data analysis 445 includes generating randomized subsets of cluster configuration parameters at uniform data growth of simulated Big Data component parameters and measuring the performance of key identified parameters at different workload levels in the computing infrastructure.

The data for analysis includes operations of a conductor node 430 in relation to establishing system resources for operation, and data collected by system level counters 435 in the computing infrastructure. The system level counters 435 may produce data related to usage patterns and application level performance metrics, wherein the counters may include Intel® PAT (Platform Analysis Technology) counters and/or Hadoop MapReduce job counters. The system level counters 435 provide collected data to multiple member nodes 440 in workload operations.

Figure 5:
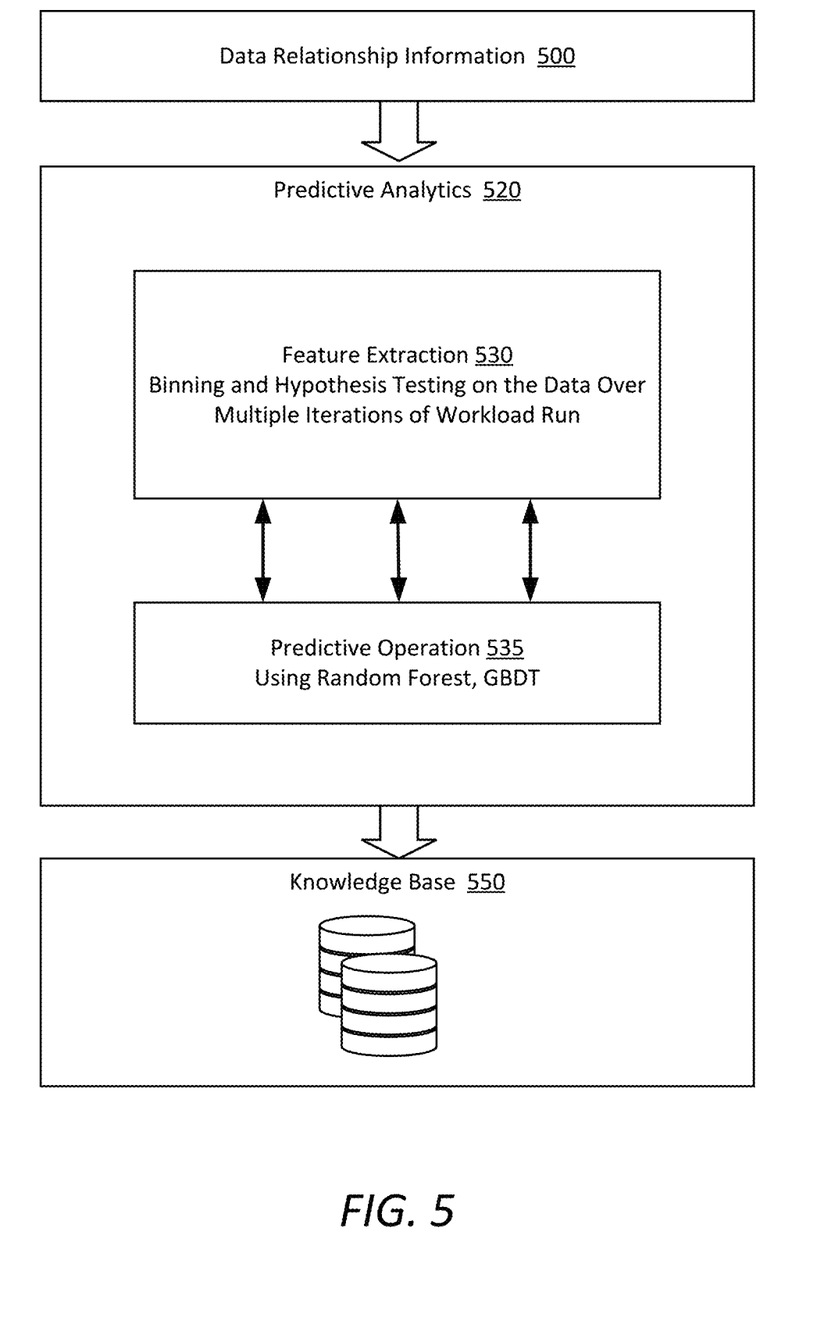
FIG. 5 is an illustration of predictive analytics for predictive capacity planning, according to some embodiments.

In some embodiments, the resulting data relationship information produced from the data analysis 445 is provided for predictive analytics 450, such as a predictive analytics component or apparatus 520 as illustrated in FIG. 5.

FIG. 5 is an illustration of predictive analytics for predictive capacity planning, according to some embodiments. In some embodiments, a predictive analytics component or apparatus 520 is to receive data relationship information 500 regarding relationships between workload and computing operation data, such as illustrated in FIG. 4, and utilize such information in predictive analytics in a computing infrastructure.

In some embodiments, the predictive analytics include feature extraction 530, wherein the feature extraction may utilize data binning (gathering the data into bins based on value) and application of hypothesis testing on that data, which may in particular regard data collected over multiple iterations of a workload run in the computing infrastructure. The predictive analytics are to, for example, identify significant counters as features that are responsible for performance variations in workload processing (i.e., changes in the values of the significant counters will result in changes in the performance of the computing infrastructure in performing the workload processing), and to identify corresponding usage patterns characteristics for different data growth scale factors.

In some embodiments, the features derived by the binning and hypothesis testing techniques, which may include job counters, resource patterns, scale factor (regarding the increase in input dataset size), number of data nodes, and cluster configurations, are then processed utilizing collaborative filtering/content-based filtering (referring in general to filtering to provide a prediction or recommendation based on based on previous information, such as actions or feedback) machine-learning techniques to generate a machine learning model to derive optimal price/performance tuning and configuration recommendations for a given data growth scale factor or deployment, wherein the recommendations may be based at least in part on requirements for a customer, such as the requirements data 300 illustrated in FIG. 3. As illustrated in FIG. 5, the predictive analytics includes the application of a predictive operation 535 on the derived features extracted by feature extraction 530. The predictive operation 535 may include application of a machine learning algorithm. For example, the Random Forest classification supervised learning algorithm is a supervised machine learning algorithm based on ensemble learning; and GBDT (Gradient Boosted Decision Tree) gradient boosting is a machine learning technique for regression and classification problems, which produces a prediction model in the form of an ensemble of prediction models.

In some embodiments, the results of the predictive analytics are utilized in generating a knowledge base (KB) 550, wherein the knowledge base 550 may specifically include, for example, performance delta key value mappings for each classified Big Data component and cluster configuration parameter for the computing infrastructure. The knowledge base 550 may then be utilized for building a machine learning model, as further illustrated in FIG. 6.

FIG. 6 is an illustration of the building and application of a trained machine learning model for predictive computing infrastructure capacity planning, according to some embodiments. In some embodiments, the knowledge base 605 includes a history of performance delta key value mappings for each classified Big Data component and cluster configuration parameter. The knowledge base 605 (such as a knowledge base generated as illustrated by FIG. 5) is used for building a machine learning model, which is capable of learning adaptively as different Big Data components and use cases are trained. This is illustrated as the knowledge base 605 being applied as input in a machine learning training operation 610 to train an initially untrained neural network 615 to produce a trained neural network (the ML model) 620.

In some embodiments, the ML model employs gradient boosted decision trees to derive optimal configurations for each Big Data component classification and use case. The ML model 620 is further optimized as more customer use cases are provided, as further described below. For example, different teams in a Big Data customer may generate use case data by evaluating Big Data solution stacks.

In some embodiments, the trained ML model 620 can be applied for or provided to customers to generate recommended configuration details in a computing infrastructure to address future data growth. This is illustrated as the application of input data 625 in an inference operation utilizing the trained ML model 620 to generate capacity planning recommendations for the customer 630, the capacity planning recommendations being based at least in part on meeting the requirements of the clients, such as illustrated in the requirements data 300 illustrated in FIG. 3. The input data 625 includes a prediction or estimation of future data growth for a customer. The future data growth may include an estimated increase in data in terms of an amount or percentage over of data a certain period of time. For example, a customer may determine that it is expected that the data growth will increase by a first percentage in the current year, and a second different percentage in the following year, or any other data growth pattern. In some embodiments, the input data 625 may include other information relevant to the capacity planning, such as the types of data that are subject to growth.

In general, once a neural network (i.e., ML model 615) is structured, a learning model can be applied to the network to train and optimize the network to perform specific tasks. The learning model describes how to adjust the weights within the model to reduce the output error of the network. The ML model 615 is further optimized, and thus converges to a better solution, as additional use case data is received and applied in the training of the model. As illustrated in the ML training operation, backpropagation of errors 612 is a common method used to train neural networks. In such training, an input vector is presented to the network for processing. The resulting output of the network is compared to the desired output using a loss function, and an error value is calculated for each of the neurons in the output layer. The error values are then propagated backwards until each neuron has an associated error value that roughly represents its contribution to the original output. The network can then learn from those errors using an algorithm, such as the stochastic gradient descent algorithm, to update the weights of the of the neural network.

The training of the ML model may proceed according to known neural network techniques. For example, to commence the training process (shown as ML training operation 610), initial weights may be chosen randomly or by pre-training. The training cycle then be performed in a supervised manner, supervised learning being a learning method in which training is performed as a mediated operation, such as when the training dataset includes input paired with the desired output for the input, or where the training dataset includes input having known output and the output of the neural network is manually graded. The network processes the inputs and compares the resulting outputs against a set of expected or desired outputs. Errors are then propagated back 612 through the system. The applicable training framework can adjust to modify the weights that control the untrained neural network 615. The training framework can provide tools to monitor how well the untrained neural network 615 is converging towards a model suitable to generating correct answers based on known input data. The training process occurs repeatedly as the weights of the network are adjusted to refine the output generated by the neural network. The training process can continue until the neural network reaches a certain threshold accuracy associated with a trained neural network 620.

Figure 7:
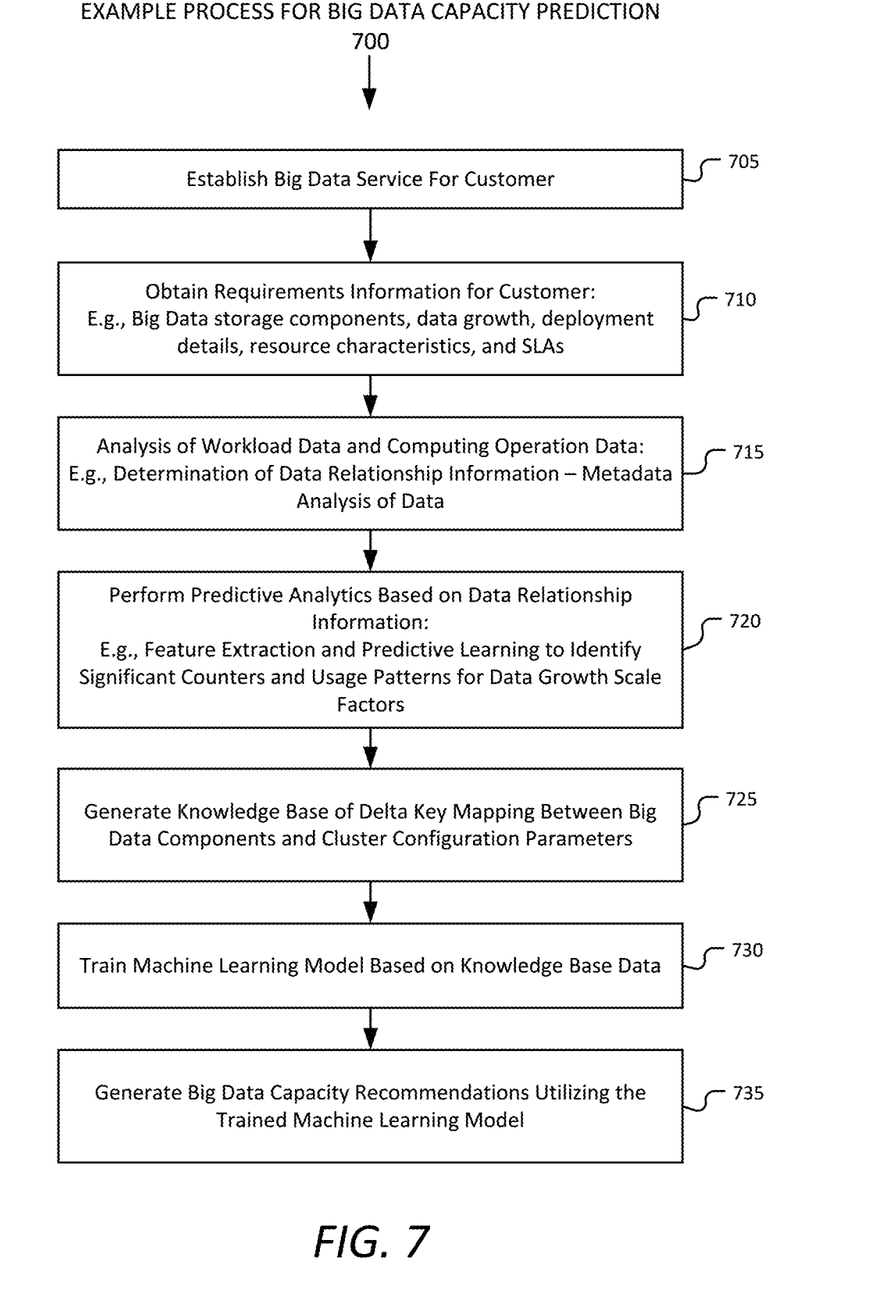
FIG. 7 is a flowchart to illustrate an example of a process for predictive Big Data capacity planning, according to some embodiments.

FIG. 7 is a flowchart to illustrate an example of a process for predictive Big Data capacity planning, according to some embodiments. In some embodiments, an example process for Big Data capacity prediction 700 includes establishing Big Data service to support operations for a customer 705, where the operations may include, for example IaaS (Infrastructure as a Service) operations for the customer. The operations may include provision of computing infrastructure services for multiple customers, such as illustrated in FIG. 1. In some embodiments, the process may include obtaining requirements information that relates to operations of the customer at block 710, wherein the requirements information may include information regarding Big Data components, data growth (scaling), deployment details, resource characteristics, and SLAs for the customer, such as illustrated in FIG. 3, wherein the Big Data capacity prediction is based at least in part on the obtained requirements information.

In some embodiments, the process 700 further proceeds with analysis of workload data and computing operation data at block 715 to determine relationships between such data. In some embodiments, the computing operation data may include data from system level counters that is provided to member nodes, such as the member nodes 440 receiving data from system level counters 435 as illustrated in FIG. 4. In some embodiments, the data analysis includes analysis of metadata related to the received workload data and computing operation data.

In some embodiments, the process 700 further includes performing predictive analytics at block 720 based on the data relationship information determined at block 710, wherein the predictive analytics may include performing feature extraction and predictive learning based on the collected relationship information to identify significant data elements, such as significant counters of the system level counters, and usage patterns for data growth scale factors related to the operations for the customer. This may include operations as illustrated in FIG. 5. In some embodiments, the predictive analytics include application of collaborative filtering/content-based filtering machine-learning techniques to generate a machine learning model to derive optimal price/performance tuning and configuration recommendations for a given data growth scale factor or deployment, wherein the recommendations may be based at least in part on requirements for a customer, such as the requirements data 300 illustrated in FIG. 3. In some embodiments, the process 700 may further include generating a knowledge base utilizing the results of the predictive analysis at block 725, which may contain, for example, delta key mapping between Big Data components for the customer and related cluster configuration parameters.

In some embodiments, the process 700 further provides for training a machine learning model based on training data derived from the knowledge base at block 730, wherein the training may be performed as illustrated in FIG. 6. The trained machine learning model may then be utilized (i.e., in an inference operation) to generate Big Data capacity recommendations for the customer at block 735. Such recommendations may then be provided to the customer for use in selecting a course of action in establishing Big Data capacity to meet customer needs and SLA requirements without requiring any overcapacity in the computing infrastructure.

Figure 8:
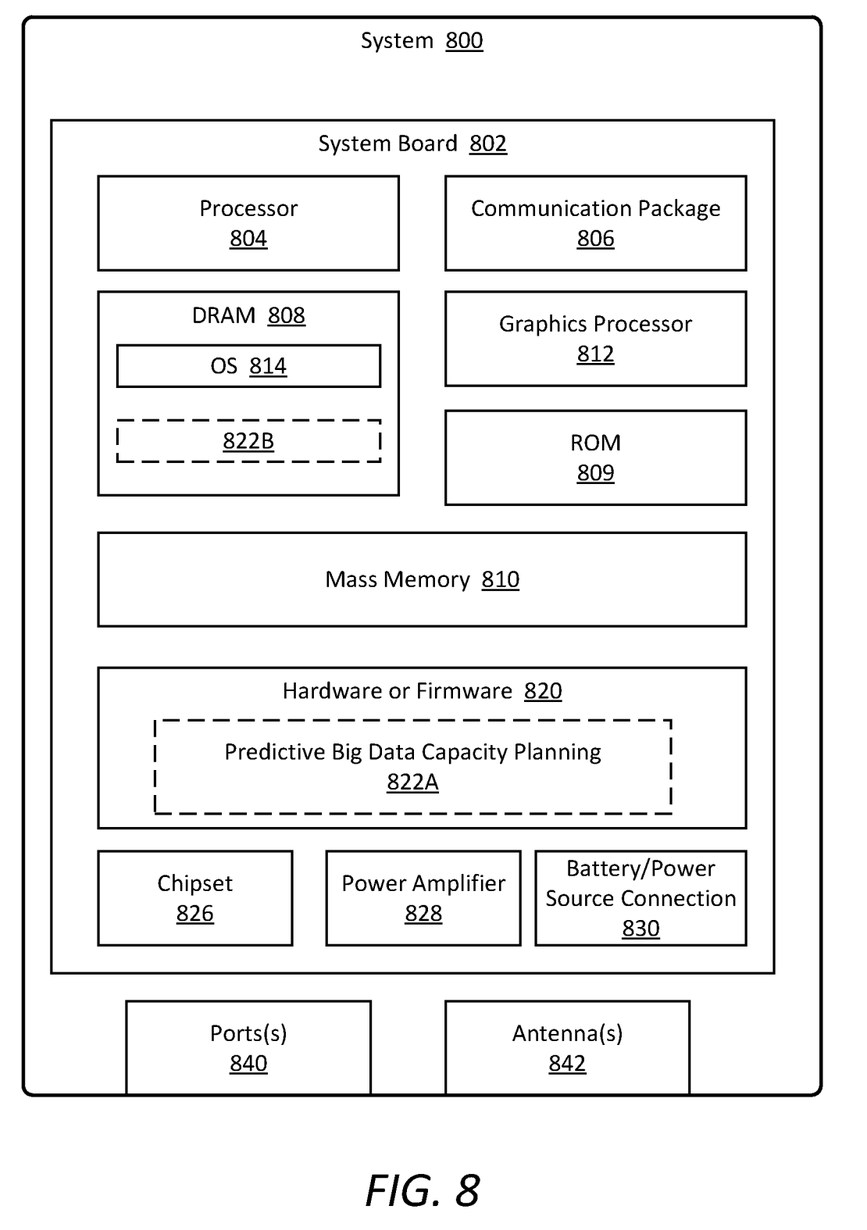
FIG. 8 is an illustration of a system to provide predictive Big Data Capacity planning, according to some embodiments.

FIG. 8 is an illustration of a system to provide predictive Big Data Capacity planning, according to some embodiments. In some embodiments, the system 800 may provide for operations related to predict an optimized Big Data capacity for one or more customers, such as illustrated in one or more of FIGS. 1-7. The system may include support for Infrastructure as a Service (IaaS) or other data infrastructure to provide Big Data infrastructure support for the one or more customers.

In some embodiments, the system 800 includes predictive Big Data capacity planning 822, which may be provided as software instructions, firmware, hardware, or a combination thereof. For example, the predictive Big Data capacity planning 822 is shown as within hardware or firmware 820 (illustrated as 822A), or within DRAM memory 808 (illustrated as 822B). In some embodiments, the predictive Big Data capacity planning 822 is to apply predictive analytics that can predict cost-optimal configurations and environments for Big Data customers on complex deployments, ensuring compliance with the customers business SLAs while also avoiding costly overcapacity.

System 800 houses a system board 802. The system board 802 may include a number of components, including but not limited to a processor 804. The system 800 may further include at least one communication package or chip 806. The communication package 806 is coupled to one or more antennas 842. The system may further include volatile memory (e.g., DRAM) 808, nonvolatile memory (e.g., ROM) 809, a graphics processor 812, a chipset 826, a battery or power source connection 830, a power amplifier 828, a mass storage device (such as a solid state drive or hard disk drive) 810, and one or more ports 840 for wired connection. These components may be connected to the system board 802, mounted to the system board, or combined with any of the other components.

In some embodiments, system 800 further includes an operating system 814, such as illustrated in DRAM 808. In various implementations, the system 800 may be, for example, a server, storage element, or other physical element related to a hyper-converged infrastructure. Embodiments may be implemented using one or more memory chips, controllers, CPUs (Central Processing Unit), GPUs (Graphics Processing Units), microchips or integrated circuits interconnected using a motherboard, an application specific integrated circuit (ASIC), a field programmable gate array (FPGA), or other logic. The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums have stored thereon executable computer program instructions that, when executed by one or more processors, cause the one or more processors to perform operations comprising: receiving workload data and computing operation data related to workload processing for a customer in a computing infrastructure, the computing infrastructure including one or more clusters, the one or more clusters including one or more data nodes; analyzing the received data to identify relationship information between the workload data and the computing operation data; performing predictive analytics to identify a significant value that relates to performance variations in workload performance or usage pattern characteristics for data growth scale factors in the computing infrastructure; generating a knowledge base based at least in part on the predictive analytics; training a machine learning model based at least in part on the knowledge base; and utilizing the trained machine learning model to generate a computing infrastructure configuration recommendation for the customer.

In some embodiments, a system includes one or more processors to perform processing of operations; and a memory to store data, including data regarding a computing infrastructure for a customer, wherein the system is to provide predictive computing infrastructure capacity planning, including: receiving workload data and computing operation data related to workload processing for a customer in a computing infrastructure, the computing infrastructure including one or more clusters, the one or more clusters including one or more data nodes; analyzing the received data to identify relationship information between the workload data and the computing operation data; performing predictive analytics to identify a significant value that relates to performance variations in workload performance or usage pattern characteristics for data growth scale factors in the computing infrastructure; generating a knowledge base based at least in part on the predictive analytics; training a machine learning model based at least in part on the knowledge base; and utilizing the trained machine learning model to generate a computing infrastructure configuration recommendation for the customer. In some embodiments, a method includes receiving a stream of workload data and system level counter data related to workload processing for a customer in a computing infrastructure, the computing infrastructure including one or more clusters, the one or more clusters including one or more data nodes; analyzing the received data to identify relationship information between the workload data and the system level counter data; performing predictive analytics to identify a significant counter value that relates to performance variations in workload performance or usage pattern characteristics for data growth scale factors in the computing infrastructure; generating a knowledge base based at least in part on the predictive analytics; training a machine learning model based at least in part on the knowledge base; and utilizing the trained machine learning model to generate a computing infrastructure configuration recommendation for the customer.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Processes can be added to or deleted from any of the methods described above and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A non-transitory computer-readable storage medium having stored thereon executable computer program instructions that, when executed by a processor, cause the processor to perform operations comprising:
   receiving workload data and computing operation data related to workload processing for a customer in a computing infrastructure, the computing infrastructure comprising one or more clusters, the one or more clusters comprising one or more data nodes;
   determining a growth scale rate of the workload data and the computing operation data;
   measuring performance variations of simulated data component parameters at different workload levels in the computing infrastructure, the simulated data component parameters correlated with the growth scale rate of the workload data and the computing operation data;
   correlating the performance variations at the different workload levels to performance variations in system counters at the different workload levels in the computing infrastructure;
   using the correlation between the performance variations and the system counters to generate a usage pattern characteristic rate for the customer that increases in accordance with the growth scale rate;
   generating a knowledge base based at least in part on the performance variations and the system counters;
   training a machine learning model based at least in part on the knowledge base; and
   utilizing the trained machine learning model to generate a computing infrastructure configuration recommendation for the customer.

2. The storage medium of claim 1, wherein the computing infrastructure provides Big Data operations.

3. The storage medium of claim 1, wherein the operations further comprise:
   collecting requirements for the customer in the computing infrastructure; and
   utilizing the collected requirements in generating the computer infrastructure recommendation.

4. The storage medium of claim 3, wherein the collected requirements comprise one or more of data storage components, current data growth, deployment details, resource characteristics, and SLAs (Service Level Agreements).

5. The storage medium of claim 1, wherein the operations further comprise:
   analyzing metadata related to the workload data and the computing operation data.

6. The storage medium of claim 1, wherein the computing operation data comprises system level counter data to measure usage patterns or performance metrics for the computing infrastructure.

7. The storage medium of claim 1, wherein the operations further comprise:
   performing feature extraction to derive features from the received data; and
   applying a predictive operation on the derived features for generation of the knowledge base.

8. The storage medium of claim 1, wherein the knowledge base comprises delta key value mappings for data components and cluster configuration parameters in the computing infrastructure.

9. The storage medium of claim 1, wherein the computing infrastructure configuration recommendation for the customer comprises a data capacity recommendation to meet data growth for the customer.

10. The storage medium of claim 1, wherein the operations further comprise:
    receiving response-time optimized, throughput optimized, or cost optimized requirements for service level agreements (SLAs) for the customer; and
    confirming the computing infrastructure configuration recommendation for the customer meets the SLAs for the customer.

11. The storage medium of claim 1, wherein the system counters are generated using a data binning and application of hypothesis testing on the workload data and the computing operation data.

12. The storage medium of claim 1, wherein the trained machine learning model utilizes gradient boosted decision trees to derive the computing infrastructure configuration recommendation for the customer.

13. A system comprising:
a processor to perform processing of operations; and
a memory to store data, comprising data regarding a computing infrastructure for a customer, and to store instructions that, when executed, cause the processor to perform operations comprising:
   receiving workload data and computing operation data related to workload processing for a customer in a computing infrastructure, the computing infrastructure comprising one or more clusters, the one or more clusters comprising one or more data nodes;
   determining a growth scale rate of the workload data and the computing operation data;
   measuring performance variations of simulated data component parameters at different workload levels in the computing infrastructure, the simulated data component parameters correlated with the growth scale rate of the workload data and the computing operation data;
   correlating the performance variations at the different workload levels to performance variations in system counters at the different workload levels in the computing infrastructure;
   using the correlation between the performance variations and the system counters to generate a usage pattern characteristic rate for the customer that increases in accordance with the growth scale rate;
   generating a knowledge base based at least in part on the performance variations and the system counters;
   training a machine learning model based at least in part on the knowledge base; and
   utilizing the trained machine learning model to generate a computing infrastructure configuration recommendation for the customer.

14. The system of claim 13, wherein the computing infrastructure provides Big Data operations.

15. The system of claim 13, wherein the processor performs operations further comprising:
   analyzing metadata related to the workload data and the computing operation data.

16. The system of claim 13, wherein the computing operation data comprises system level counter data to measure usage patterns or performance metrics for the computing infrastructure.

17. A method comprising:
   receiving a stream of workload data and system level counter data related to workload processing for a customer in a computing infrastructure, the computing infrastructure including one or more clusters, the one or more clusters including one or more data nodes;
   determining a growth scale rate of the workload data and the stream of workload data;
   measuring performance variations of simulated data component parameters at different workload levels in the computing infrastructure, the simulated data component parameters correlated with the growth scale rate of the workload data and the stream of workload data;
   correlating the performance variations at the different workload levels to performance variations in system counters at the different workload levels in the computing infrastructure;
   using the correlation between the performance variations and the system counters to generate a usage pattern characteristic rate for the customer that increases in accordance with the growth scale rate;
   generating a knowledge base based at least in part on the performance variations and the system counters;
   training a machine learning model based at least in part on the knowledge base; and
   utilizing the trained machine learning model to generate a computing infrastructure configuration recommendation for the customer.

18. The method of claim 17, wherein the stream of data is received at regular intervals.

19. The method of claim 17, further comprising:
   analyzing metadata related to the workload data and the counter data.

20. The method of claim 17, wherein the computing infrastructure configuration recommendation for the customer comprises a data capacity recommendation to meet data growth for the customer.

* * * * *